Sheet 1 - 3 Sheets.
E. B. Bigelow.
Loom.
No. 87.
Reissued Sept. 26, 1846.
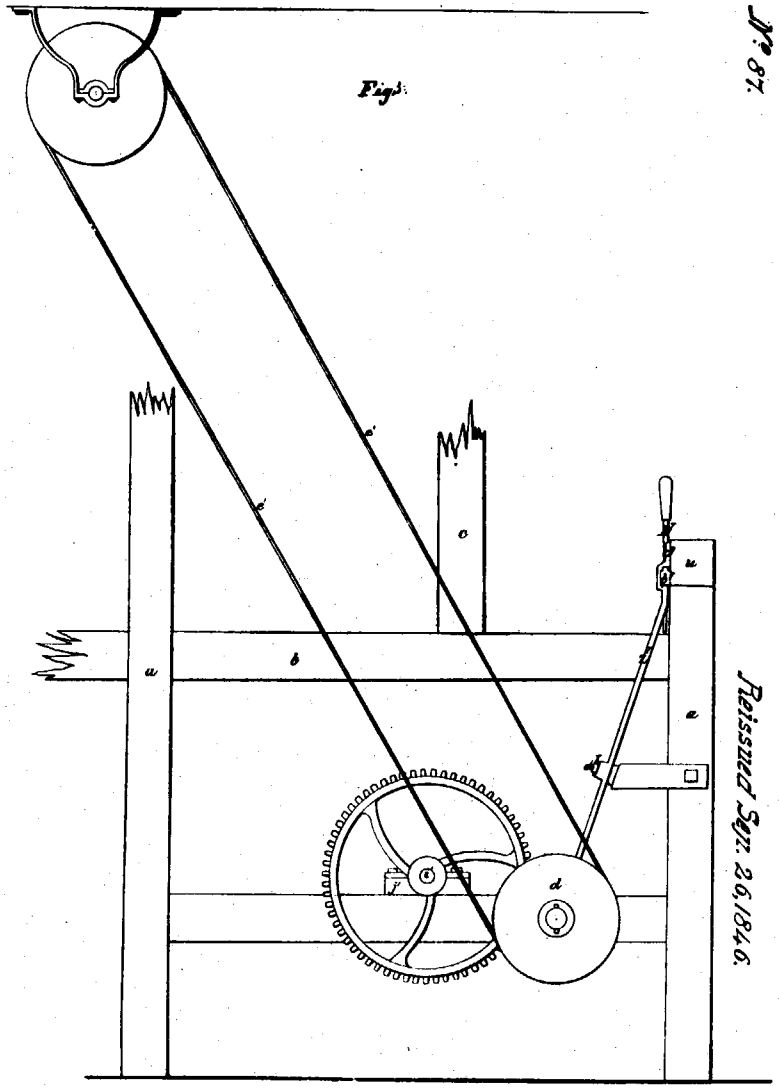
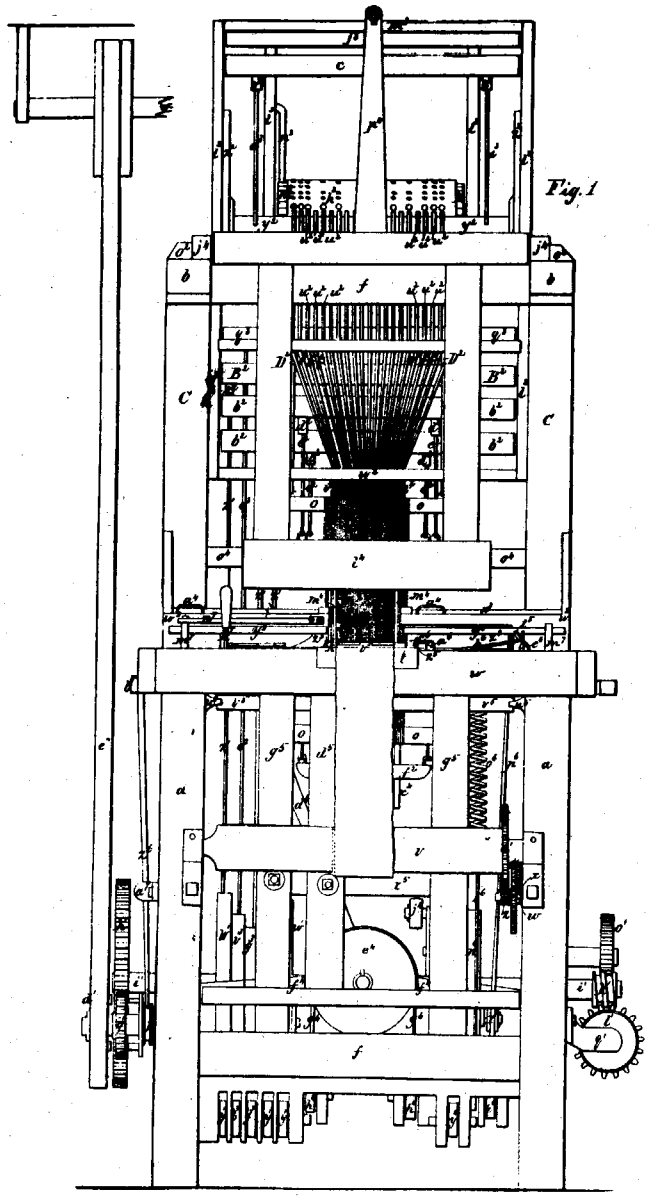

Sheet 2 - 3 Sheets.
E. B. Bigelow.
Loom.
No. 87.
Reissued Sept. 26, 1846.
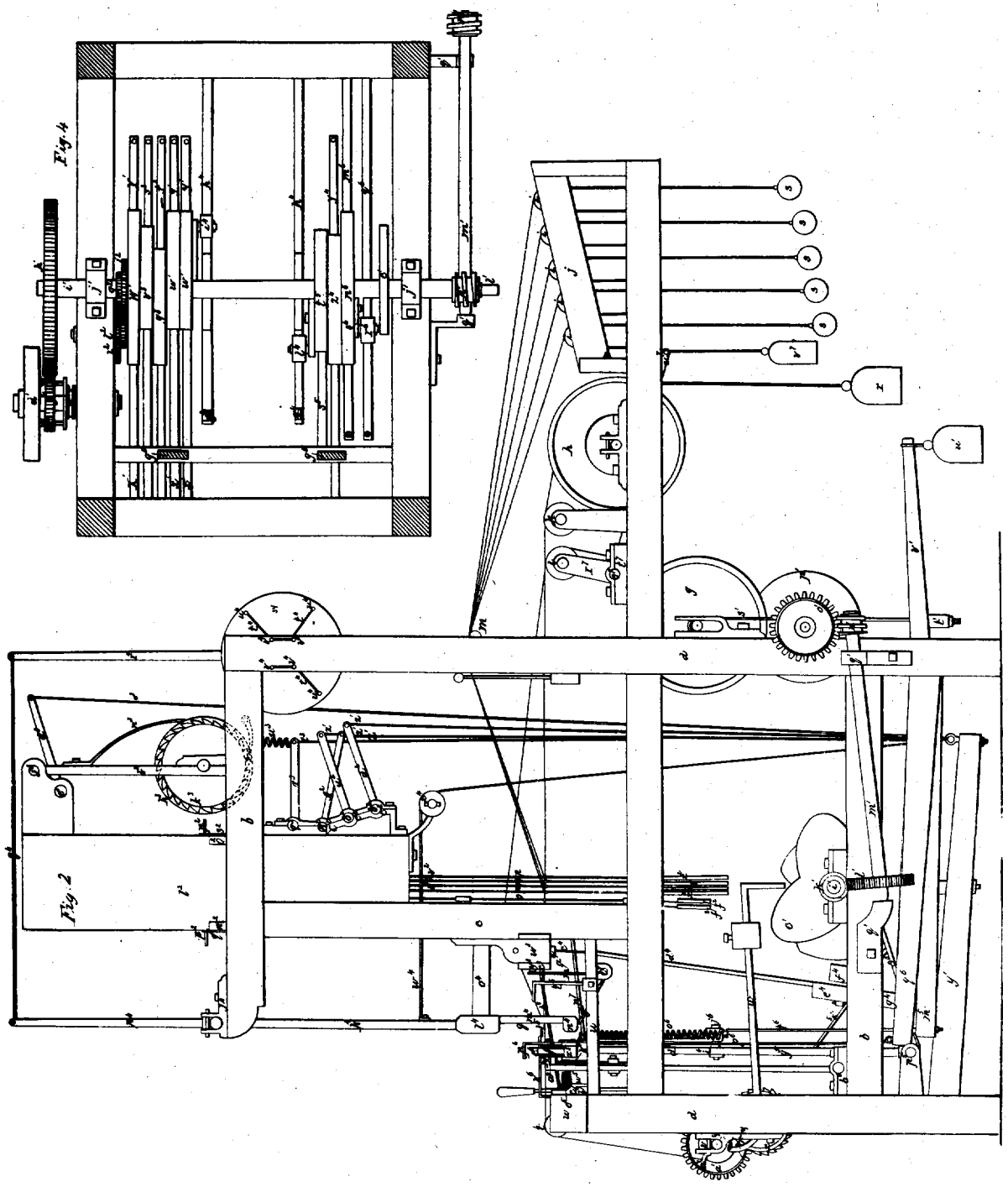

Sheet 3-3 Sheets.
E. B. Bigelow.
Loom.
No. 87.
Reissued Sept. 26, 1846.
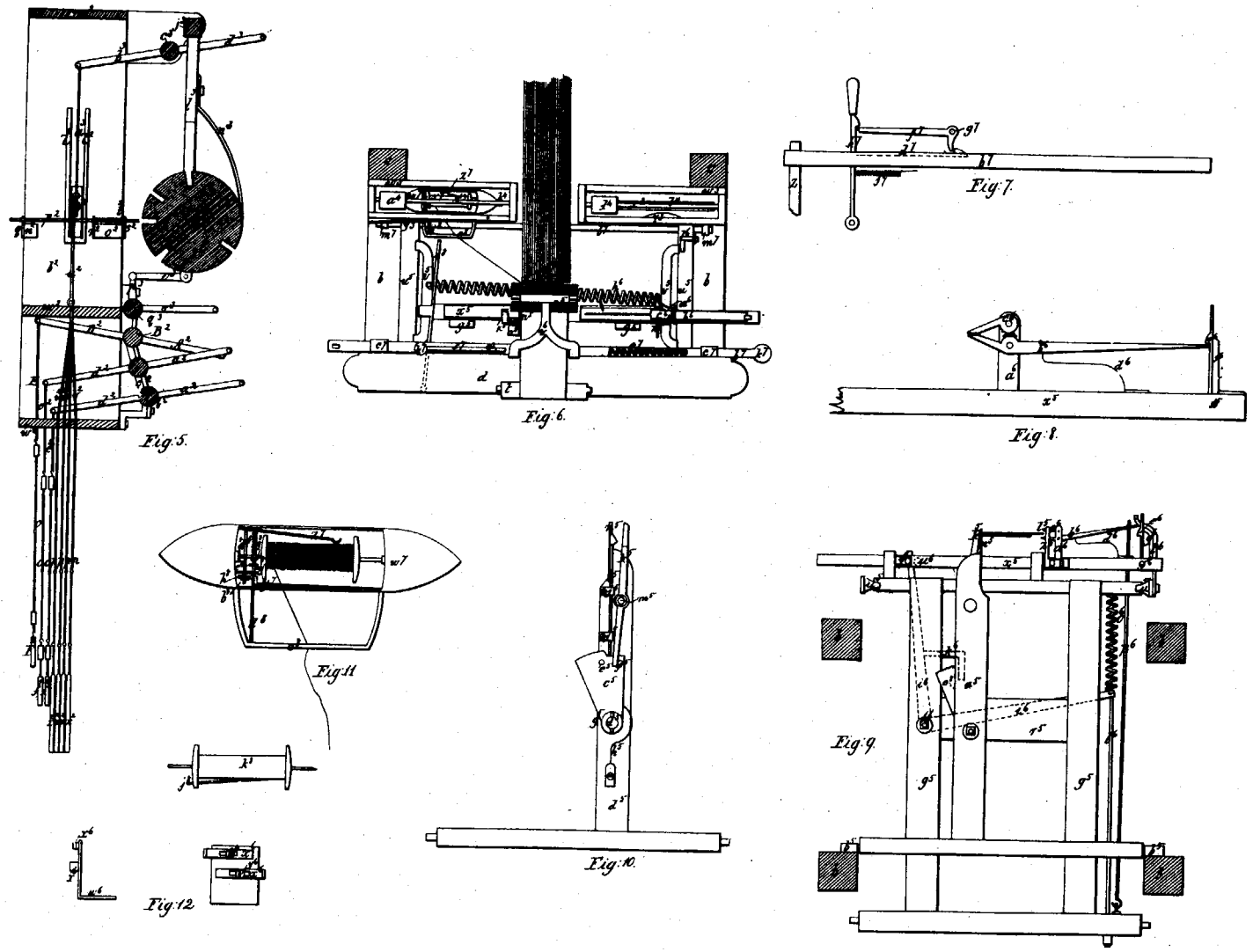

UNITED STATES PATENT OFFICE.

E. B. BIGELOW, OF BOSTON, MASSACHUSETTS.

IMPROVEMENT IN POWER-LOOMS FOR WEAVING COACH-LACE AND OTHER SIMILAR FABRICS.

Specification forming part of Letters Patent No. 169, dated April 20, 1837; Reissue No. 87, dated September 26, 1846.

*To all whom it may concern:*

Be it known that I, ERASTUS B. BIGELOW, of Boston, in the county of Suffolk and State of Massachusetts, have invented new and useful improvements in looms to weave coach-lace and such other similar-wrought fabrics as may be woven by the said machinery, which improvements combined are denominated "Bigelow's Power Coach-Lace Loom;" and I do hereby declare that the following is a full, clear, and exact description of the principle or character which distinguishes them from all other things before known, and of the manner of making, constructing, and using the same, reference being had to the accompanying drawings, making part of this specification, in which—

Figure 1 is a front elevation of the loom. Fig. 2 is a profile elevation of the right end of the loom. Fig. 3 shows the driving parts of the loom on the left end. Fig. 4 is a horizontal view of the cams and treadles, with the upper part of the loom removed. Fig. 5 is a sectional view of the figuring-works, detached from the machine. Fig. 6 is a horizontal view of the parts of the loom forward of the shuttle-boxes. Fig. 7 represents the stop-motion. Fig. 8 is a side view of the pliers or forceps, with one standard removed. Fig. 9 is a front view of the apparatus to shift the wires, detached from the machine. Fig. 10 is a back view of the apparatus to push the wires toward the pliers or forceps. Fig. 11 represents the shuttle and bobbin. Fig. 12 represents the temples or cloth-guides.

The same letters indicate like parts in all the figures.

In the weaving of coach-lace and other similar fabrics in which the figure is formed by raising the warp alone, wires are introduced, after any given number of beats of the lay, under that portion of the warp which forms the figure, the warp being drawn tight over the wire preparatory to weaving in by the weft. For this purpose several wires are employed, as the wires must be retained for some distance, to prevent the draft on the warp from pulling out the previously-formed figuring-loops. The number of wires employed are therefore, in succession, drawn out from the woven fabric and shifted to the unwoven part.

Prior to my invention this operation of drawing and reinserting the wires was performed by hand—a tedious, laborious, and expensive operation.

An important part of my invention consists in rendering this part of the operation self-acting or automatic, by the employment, first, of a pointed instrument introduced between and which separates the wire to be drawn out at each operation from the others, the motions of this being effected by mechanical means so combined and organized with the other parts of the loom as to perform its appropriate functions relatively to the other operations of the loom; secondly, of another instrument which pushes or forces out the said wire until it strikes the selvage of the fabric, to carry its opposite end beyond the end of the remaining wires, to be taken by—what constitutes the third part of my invention—a pair of pinchers, pliers, or forceps, or other analogous instrument so operated as to grip the end of the wire, draw it out from under the formed figuring-loops, carry it back, and then introduce it in the open shed that is between the open warps, and there deposit it preparatory to the formation of another range of loops, the movements of the pusher and pinchers being so regulated and organized relatively to the weaving parts of the loom and the separating-instrument as to perform their appropriate functions at the times and under the circumstances required.

The fourth part of my invention consists in the employment of a guide that rests against the last of the series of looping-wires, to adjust the position of the parts that shift the wires relatively to the one on which they are required to act.

In all looms with which I am acquainted, and known prior to my invention, the shuttle-boxes, or recesses that receive the shuttle when thrown or carried from one side to the other to lay the weft between the warps, are attached to and moved back and forth with the lay. This mode of arranging the shuttle-boxes is not only defective in reference to the general operation of weaving, from the fact that after the weft has been carried up (termed "beat up") by the reed in the lay it is loosened and drawn back alternately on opposite sides of the cloth by the back movement of the shuttle-boxes when carried back by the lay; but this arrangement presents serious obstacles to the application of the mechanism for operating the looping-wires.

To avoid these objections was the object of the fourth part of my invention, which consists in making the shuttle-boxes separate from the lay, that it (the lay) may move and beat up the weft or filling and looping-wires independent of the shuttle-boxes, the motions of the lay being so regulated that the race-board shall be still and on a line with the shuttle-boxes at the time the shuttle is thrown. By this means I attain the necessary room for the mechanism employed in operating the looping-wires, and the back movement of the lay does not tend to draw back or loosen the last weft-thread that has been forced up by the beat of the lay.

In the accompanying drawings, *a a a a* are four upright posts, which are connected together by horizontal rails *b b b b*. *c c* are two other upright posts, resting on the cross-rails *b b*. *f f f f* are cross horizontal rails for connecting the ends of the frame-work.

The warp-beam *g*, containing the linen or ground warp, and the warp-beam *h*, containing the worsted or that warp which is raised above the ground-warp to conceal the weft, are mounted on axles turning in bearings attached to the frame-work. The bobbins *i i i* contain the figuring-warp, and are supported by the crul *j*. From these beams and bobbins the warp-threads pass over their respective whip-rollers *k l m*, thence through the ruddle *n*, heddles *o o* and *p p*, and reed *q*, in ordinary way. *r* is a weight suspended by a friction-cord passing around the warp-beam *h*, to keep the warp at a proper degree of tension. The weights *s s s s*, in the same manner, preserve the tension of the figuring-warp.

The cloth produced by the intervention of the warp and weft threads in front of the reed passes over the roller *t*, turning in bearings in the breast-beam *u*, and is wound upon the cloth-roller *v*. *w* is a lever turning on the stud of the ratchet-wheel *x*, with the clicks *y y* jointed to its short arm. These clicks act on and turn the ratchet-wheel *x* when the lever *w* is moved by the cam *c'*. The pinion-gear *c*, on the side of the ratchet-wheel *x*, takes into the teeth of the cogged-wheel *a'*, affixed to the axle of the cloth-roller *v*. Clicks playing on a stud attached to the post *a*, (being hid in the drawings behind the post *a*,) act on the teeth of the ratchet-wheel *x*, in the usual manner to secure the lace that has been wound up when the clicks *y y* release their hold to act on other teeth. The pulled or rigger *d'* receives its motion from the mill-work by the belt *e'*, and moves the loom when the clutch *f'* connects it with the pinion-gear *g'*. This pinion takes into the cogged wheel *h'* affixed to the main axle *i'*. The axle *i'* is arranged horizontally across the loom and turns in the bearings *j' j'*. This axle, by means of an endless screw and cams or wipers attached thereto, gives the principal motions of all the operations performed by the machine. The first of these operations to be described is the giving out of the linen warp as fast as it is filled by the weft; second, that which raises and depresses the warp to receive the shuttle; third, regulating the variations in the pattern or figure; fourth, driving the shuttles to and fro; fifth, beating up the weft; sixth, shifting the wires over which the figure is wrought.

The linen or ground warp is given out as follows: The worm or endless screw *k'* is affixed to the end of the shaft *i'*, and takes into the teeth of the cogged wheel *l'* on the end of the axle *m'*. To the reverse end of the axle *m'* another worm or endless screw, *n'*, is affixed, which takes into the teeth of the cogged wheel *o'*, and revolves the cylinder *p'*. The axle *m'* turns in bearings *q' q'*, attached to the frame-work.

The diameter of the cylinder *p'* and the number of teeth of the cogged wheels *l' o'* are so proportioned as to move the disk or circumference of the cylinder *p'* at each throw of the shuttle through a space equal to the length of the linen warp filled by the thread of the weft thus introduced. The upper extremities of the wires *s' s'* hook onto the ends of the axle of the warp-beam *g*, and are connected at their lower extremities by the cross-bar *t'*. The weight *u'* is suspended from the lever *v'*, resting on the cross-bar *t'*, and presses the warp on the warp-beam *g* against the periphery of the cylinder *p'*, thus causing the beam *g* to turn with the cylinder *p'*, and deliver a certain length of warp at each revolution of the cylinder, however much the diameter of the warp around the beam may vary. The whip-roller *l*, over which the linen warp passes, turns in bearings in the arms $r^1$ $r^1$, extending from the axle $s^1$, which turns in the bearings $t^1$ $t^1$.

$w^1$ is an arm extending from the axle $s^1$, from which the weight $v^1$ is suspended, which weight serves to tighten the warp, and at the same time allow the whip-roller *l* to move forward and prevent too great tension of the warp when the heddles are raised to form the sheds.

The raising and depressing of the warp to receive the shuttle is effected as follows: The cams or wipers *w' w'* W' are affixed to the axle *i'* and act on the levers or treadles *y' y'* Y', which play on the fulcra at the ends *x' x'* X'. The straps or cords *z' z'* Z' connect the treadles *y' y'* Y' to the arms $a^2$ $a^2$ $A^2$, Figs. 2 and 5, extending from the axles $b^2$ $b^2$ $B^2$, which turn in the bearings $c^2$ $c^2$ $C^2$. $d^2$ $d^2$ $D^2$ are arms extending from the reverse sides of the axles $b^2$ $b^2$ $B^2$, from which the heddles *o o* O are suspended by the cords $e^2$ $e^2$ $E^2$. $f^2$ $f^2$ $F^2$ are weights connected to the bottom of heddles *o o* O. As the shaft *i'* revolves, the eccentric parts of the cams come round at proper intervals and force down the treadles *y' y'* Y', which, by means of the cords *z' z'* Z' turn the axles $b^2$ $b^2$ $B^2$, raises the heddles, and forms the sheds of the warp. When the cams relieve their action on their respective treadles, the heddles are again depressed by the weights $f^2$ $f^2$ $F^2$. The two leaves of heddles *o o* are sufficient to weave laces with plain grounds or fabrics; but in weaving those laces in which certain of the warp-threads are overlaid, the third leaf, O, is required, which leaf being raised relatively at such distant intervals of time requires a graduated motion of the cam which moves it. This is effected as follows: The cogged wheel $g^2$, Fig. 4, affixed to the axle $i'$, takes into the teeth of the largest part of the pinion-wheel $h^2$, which turns on the stud $i^2$, attached to the frame-work. The teeth of the small part of the cogged pinion $h^2$ takes into the teeth of the cogged wheel $j^2$, affixed to the cam W′, which revolves loose on the shaft $i'$. The number of teeth of these cogged wheels may be so calculated as to give different degrees of relative motion of the cam W′, according to the number of threads of the weft overlaid by the warp. Thus, when the warp overlies three threads of the weft, two revolutions of the axle $i'$ will be required to one of the cam.

The third operation, or that which regulates the variation in the pattern or figure, is next described. $l^2$ $l^2$ are upright posts or side pieces, (see Fig. 5,) which are connected together by the cross bars or rails $m^2$ $n^2$ $o^2$. When this part is connected with the main frame-work, the ends of the cross-bars $n^2$ $o^2$ rest on the horizontal rails *b b*, and are bolted or otherwise affixed thereto. $p^2$ $p^2$ $p^2$ are horizontal wires, sliding with a reciprocating motion in holes through the plates of iron $q^2$ $r^2$ $s^2$, which are screwed to the cross-rails $n^2$ $o^2$. Between the plates of iron $r^2$ $s^2$ a spiral spring is encircled around each horizontal wire $p^2$ $p^2$ $p^2$, one end of which is attached thereto by the pin $t^2$, inserted in the wire. The other abuts against the plate of iron $r^2$. This spring yields to any gentle pressure made on that extremity projecting beyond the plate of iron $s^2$, and returns again when that pressure is removed till the pin $t^2$ strikes against the plate $s^2$. Eyes are formed in the central parts of these horizontal wires through which the vertical wires $u^2$ $u^2$ pass. The wires $u^2$ $u^2$ are hooked at the upper extremity, and arranged vertically over the lifting-bar. In the lower extremities of the vertical wires eyes are formed to which the cords $v^2$ $v^2$ are attached. From these eyes the cords $v^2$ $v^2$ pass through the guide-holes in the cross-pieces $w^2$ $w^2$ to the heddles *p p*, suspended therefrom. $x^2$ $x^2$ are weights attached to the heddles *p p*, to depress them after they have been raised by the lifting-bar, and preserve their tension during the operation of the other parts of the loom. The lifting-bar $y^2$ has a vertical reciprocating motion in the guide $z^2$ $z^2$, which are attached to the side pieces of the frame $l^2$. The wires $a^3$ $a^3$ connect the lifting-bar $y^2$ to the arms $b^3$ $b^3$, extending from the axle $c^3$. $d^3$ is the reverse arm of the axle $c^3$, to which is attached the upper extremity of the cord $e^3$, Fig. 2, which connects it with the treadle $f^3$, Fig. 4. The lifting-bar $y^2$, Figs. 1 and 5, is raised by the cam $g^3$ acting on the treadle $f^3$, Fig. 4, and when the cam relieves its action thereon it falls again by its own gravity. It is evident from what has been described that when the lifting-bar $y^2$ is raised it will carry up with it all the vertical wires $u^2$ $u^3$ and heddles connected with them, and no variation will be produced in the pattern or figure; but if before we raise the lifting-bar we push back certain of the horizontal wires $p^2$ $p^2$ $p^2$ and thus withdraw the vertical wires connected with them from its action, it will carry up with it those vertical wires and heddles only the horizontal wires of which have not been pushed back, and a corresponding variation will be produced in the pattern or figure.

The apparatus to push back certain of the horizontal wires is thus described: The cylinder $h^3$ is mounted on an axle turning in bearings in the frame $l^3$, which oscillates on the axis $j^3$. In the circumference of this cylinder as many longitudinal rows of holes are formed directly opposite to the ends of the horizontal wires $p^2$ $p^2$ $p^2$, as there are variations to be made in the pattern or figure. The number and position of the holes in each row are varied according to the variation to be made in the figure—that is, holes are bored in any one of the rows opposite to the ends of those horizontal wires only which connect with the heddles required to be raised when the said row swings against the horizontal wires. The ratchet-wheel $k^3$, Fig. 2, having as many teeth as there are longitudinal rows of holes in the cylinder $h^3$, is attached to the axle of the said cylinder, and is acted on by the click in the usual manner of holding a ratchet-wheel, which (being concealed in the drawing behind the horizontal rail *b*) is attached to the frame-work. $m^2$, Fig. 1, is another ratchet-wheel, which has as many teeth and is affixed to the axle like the former, and is acted on by the spring $n^3$, attached to the frame $l^3$, Fig. 5. The bars $o^3$ $o^3$ connect the frame $l^3$ with the arms $p^3$ $p^3$ extending from the axle $q^3$. From the reverse side of this axle another arm, $r^3$, extends, which is connected with the treadle $s^3$, Fig. 4, by the cord $t^3$, Fig. 2. $u^3$ is a spring, one extremity of which is attached to the arm $r^3$, the other to the frame-work. $v^3$ is a cam or wiper attached to the axle $i'$. This apparatus operates as follows: The cam $v^3$ forces down the treadle $s^3$ and turns the axle $q^3$, which, being connected with the frame $i^3$, carries the cylinder away from the horizontal wires. As the cylinder is thus moved back one tooth of the ratchet-wheel $k^3$ strikes against the click behind the frame, which overcomes the elastic force of the spring $n^3$ and turns the cylinder on its axis the distance of one tooth of the ratchet-wheel; or, in other words, the distance between the centers of any two rows of holes in its circumference. At this instant the spring $n^3$ takes into a new space of the ratchet $m^3$ and secures the cylinder in its proper position. When the cam $v^3$ relieves its action on the treadle $s^3$, the spring $u^3$ raises the arm $r^3$ and forces the cylinder against the wires, and pushes back those which have corresponding holes in the cylinder, enter therein, and remain at rest, with the hooked wires connected with them, over the lifting-bar. The cylinder, thus presenting a new row of holes, and swinging against the ends of the horizontal wires, and pushing certain of the hooked wires from the action of the lifting-bar every time it is raised, produces variations in the pattern or figure corresponding with the variations of the holes in its circumference.

The fourth operation is that which drives the shuttle to and fro, and may be rendered as follows: The shuttle-boxs $w^3$ $w^3$, Fig. 6, are affixed to the posts $c$ $c$ and at a suitable distance to allow the reed to pass between them. $x^3$ $x^3$ are picker-rods. $y^3$ $y^3$ represent the shuttle-binders. $z^3$ $z^3$, Fig. 1, are openings or mortises in the front side of the shuttle-boxes to receive the guide-wire of the shuttle. The pickers $a^4$ $a^4$, Fig. 6, slide on the rods $x^3$ $x^3$ with their lower extremities playing in mortises $b^4$ $b^4$ in the bottom of the boxes. $c^4$ $c^4$ are picker-strings, connecting the pickers $a^4$ $a^4$ to the picker-staff $d^4$, which is affixed to the pulley $e^4$, Fig. 1. This pulley turns on a stud attached to the cross-bar $f^4$. The strap $g^4$, passing over the pulley, connects it to the treadle $h^4$ $h^4$. $i^4$ $i^4$ are cam-balls attached to the cams on the main axle $i'$, and as they revolve with the said axle force down the treadles $h^4$ $h^4$ alternately, and by means of the strap $g^4$ vibrates the picker-staff and throws the shuttle to and fro.

The weft is beat up as follows: The lay is mounted on an axle turning in bearings $j^4$ $j^4$, Fig. 2, attached to the frame-work. $k^4$ $k^4$ are the swords of the lay. $l^4$ is the top shell, which receives and supports the upper edge of the reed. The bars of iron $m^4$ $m^4$ are affixed to the top shell and extend downward to the lower shell of the lay $n^4$, and supports the lower edge of the reed. $o^4$ $o^4$ are straps with one extremity of each attached to the top shell of the lay $l^4$, the other end of each to the frame-work. The upright arm $p^4$, extending from the axle of the lay, is connected by the cord $q^4$ to the lever $r^4$, which is attached to the pulley $s^4$. The pulley $s^4$ is suspended between the posts $a$ $a$ by the cord $t^4$, passing through the holes $u^4$ $u^4$ in the pulley and the holes $v^4$ $v^4$ in the posts $a$ $a$. The pulley is turned to twist the cord, which offers a degree of resistance in proportion to the tension of the twist, and serves to bring forward the lay to beat up the weft. The cord $w^4$, attached to the lay, passes from them over the pulley $x^4$ to the treadle $y^4$. The cam $z^4$ on the main axle $i'$ forces down the treadle $y^4$, which, by means of the cord $w^4$, draws back the lay and increases the tension of the cord $t^4$, which cord, as the cam relieves its action on the treadle, throws the lay forward and beats up the weft. The degree of motion given to the lay by the cord $t^4$ is determined by the straps $o^4$ $o^4$.

We come now to the sixth operation, or that which shifts the wires over which the figure is wrought. $a^5$ is a frame similar in form to an inverted T, (see Fig. 10,) which is mounted on an axis turning in the bearings $b^5$ $b^5$, Fig. 2. $c^5$, Fig. 10, is a cam turning on the stud $d^5$, affixed to the frame $a^5$, with the studs $e^5$ $f^5$ extending from one of its sides. The stud $g^5$ extending from the frame $a^5$ determines the quantity of motion of the cam in the direction toward it. The spring $h^5$, attached to the frame $a^5$, always tends to move the cam toward the stud $g^5$. The bar $i^5$ is made flat and pointed at the upper extremity, and has a vertical reciprocating motion in the guide $j^5$ $j^5$. The lever $k^5$ has a groove at its upper extremity in that edge which presents toward the wires $l^5$ $l^5$ $l^5$, and turns on the fulcrum $m^5$ attached to the frame $a^5$. $n^5$ represents the guide-iron projecting from the upper extremity of the frame $a^5$. $o^5$, Fig. 2, represents a spring inserted between the frame $a^5$ and the breast-beam $u$. This spring presses the guide-iron $n^5$ against the last of the series of wires $l^5$ $l^5$ $l^5$, Fig. 9, or that one which is to be acted on, and thus keeps the frame $a^5$ in the same position relatively to the said wire—that is, the one to be acted on—although the position of the succeeding wires themselves as they successively approach this situation (being necessarily drawn out and placed under a new portion of the figuring-warp) may at different times vary. A frame formed similar to a lay turns on an axis in the bearings $p^5$ $p^5$, Fig. 2, affixed to the posts $a$ $a$. $q^5$ $q^5$ (see Fig. 9) are the swords, the tops of which rest against the frame $v^5$. $x^5$ is the cross-rail to connect the swords together. An arm, $s^5$, Fig. 4, is attached to this frame on which the cam $t^5$ moves to act upon it, Fig. 6. $u^5$ $u^5$ represent V-slides attached to the frame-work of the machine, on which the frame $v^5$ slides with a horizontal reciprocating motion. $w^5$ is a spiral spring, attached at one extremity to the frame $v^5$, at the other to the breast-beam $u$. The bar $x^5$, Fig. 9, slides in the standard on the frame $v^5$ with a transverse reciprocating motion. $y^5$ represents a stop attached to the bar $x^5$, which determines the quantity of approach of the pliers toward the wires $l^5$ $l^5$ $l^5$. $z^5$ represents a piece of iron, called the "evener," bolted to the bar $x^5$. To the bar $x^5$ the geared pliers are affixed, as represented in Fig. 8. $a^6$ $a^6$ are standards screwed or otherwise affixed to the box $x^5$, one of which is removed in this figure, which supports the axis of the blades of the pliers $b^6$ $c^6$. Teeth are formed on these blades at the point of contact at their centers of motion, which take into each other similar to the action of two cogged wheels, so that raising or depressing the long part of the blade $b^6$ opens and closes the pliers. $a^6$ represents a spring which is attached to the bar $x^5$, and tends to raise the long part of the blade $b^6$, and opens the pliers. The latch $e^6$ vibrates on the stud $f^6$, attached to the bar $x^5$, and is acted on by the spring $g^6$. The spiral spring $h^6$, Fig. 6, is affixed to one extremity to the bar $x^5$, at the other to the frame $v^5$. $i^6$, Fig. 9, represents an elbow playing on the stud $j^6$, with its upright arm resting against a stud, $u^6$, extending from the bar $x^5$. The hook $k^6$, attached to the upright part of the elbow, acts on the stud $e^5$ and moves the cam $c^5$. The wire $l^6$ connects the horizontal part of the elbow with the treadle $m^6$, the projection of which is acted on by the cam $n^6$, Fig. 4, affixed to the axle $i'$. The spring $o^6$, Fig. 9, being attached at one extremity of the horizontal part of the elbow $i^6$, at the other to the frame $v^5$, serves to counteract the weight of the treadle $m^6$. The latching-wire $p^6$, Fig. 1, is hooked at the upper extremity, and connected at its lower extremity to the treadle $q^6$, Fig. 4, which is acted on by the cam-ball $r^6$, playing on the stud $s^6$ attached to the cam $n^6$. The standard $t^6$, Fig. 9, attached to $v$ $u^5$ serves to release the latch $e^6$ from the blade of the pliers $b^6$.

Considering the position which the pliers or pinchers assume after having deposited a wire under the figuring-warp and returned again to a line with the wire next to be taken by them and parallel with the breast-beam as the point of commencement, we shall describe the movements of the machinery specified under this operation. The main axle $i'$, turning a notch in the cam $n^6$, comes round and suffers the spring $o^6$ to raise the treadle $m^6$ and horizontal part of the elbow $i^6$, which motion of the elbow carries its upright part away from the stud $u^6$, and allows the spring $h^6$, Fig. 6, to move the pliers toward the wires $l^5$ $l^5$ until the stop $y^5$ meets the standard of the frame $v^5$ and prevents its farther approach. As the upright part of the elbow is thus moved back the hook $k^6$, Fig. 9, acts on the stud $e^5$, and moves the cam $e^5$ toward the spring $h^5$, Fig. 10. This movement of the cam raises the bar $i^5$, and forces the point of it between the last of the series of wires $l^5$ $l^5$, or that one against which the guide-iron $n^5$ rests and the one next in order from it, and separates one from the other, and thus prevents more than one from being acted upon at the same time. When the bar $i^5$ has arrived at its greatest elevation, the stud $f^5$ strikes against the lower arm of the lever $k^5$, and forces the grooved side of the reverse arm against the end of the wire $l^5$, operated as above described, and forces it toward the pliers or forceps into the position seen in Fig. 9. At this instant the cam-ball $r^6$, Fig. 4, acts on the treadle $q^6$ and depresses the latching-wire $p^6$, which forces down the longer part of the blade $b^6$, closes the jaws of the pliers or forceps, and pinches the wire tight between them. As the longer part of the blade $b^6$ is thus depressed, the shoulder of the latch $e^6$ locks onto its extremity and secures the grasp of the pliers on the wire after the action of the cam-ball $r^6$ is relieved from the treadle $m^6$, depresses the horizontal part of the elbow $i^6$, and slides the bar $x^5$ in the standard of the frame $v^5$, which movement of the bar draws out the wire grasped by the pliers from under the figure wrought over it, and moves them into the position seen in Fig. 6. This motion of the elbow $i^6$ relieves the action of the hook $k^6$ from the stud $e^5$, Fig. 10, and allows the spring $h^5$ to move the cam $c^5$ back against the stud $g$, which movement of the said cam suffers the bar $i^5$ to fall, and causes the stud $f^5$ to move the lever $k^5$ into the positions in which they are respectively seen in Fig. 6 and 10, and in which they are prepared to act on the succeeding wires. At the proper interval the cam $t^5$, Fig. 4, acts on the arm $s^5$, and slides the frame $v^5$, Fig. 6, on $u^5$ $u^5$, and carries the pliers connected with frame $v^5$ back toward the shuttle-boxes to the proper position to place the wire under the figuring-warp. At the instant they arrive at their destination another notch in the cam $n^6$ suffers the spring $o^6$ to carry the upright part of the elbow $i^6$ away from the stud $u^6$, which movement of the said elbow allows the spring $h^6$, Fig. 6, to draw the pliers up and place the wire they grasp under the figuring-warp. Just as the pliers complete their motion in this direction the latch $e^6$ strikes against the standard $t^6$, which releases it from the blades $b^6$, and suffers the spring $d^6$ to open the jaws of the pliers and drop the wire. At this instant the cam $n^6$, Fig. 4, again acts on the treadle $m^6$ and carries the pliers back a short distance to prevent their coming in contact with the wires $l^5$ $l^5$, Fig. 9, as they return toward the breast-beam. When this part of the cam has completed its action, a notch of the cam $t^5$, Fig. 4, suffers the spring $w^5$, Fig. 2, to draw the frame $v^5$, Fig. 9, back to a line with the next wire to be acted on, or, in other words, the position it assumed when we began to describe the operation. When the wires drop from the pliers they are not all in the same position—that is, some are placed under the figuring-warp farther than others. Therefore to even them and prevent any failure in the operation of shifting them, which might occur from their irregularity, the evener $z^5$, as the pliers approach the warp to deposit the wire, strikes against the wire last deposited and drives it in as far as it is suffered to do by the motion of the bar $x^5$. The wire deposited by this operation of the pliers is driven in the same manner as the other, when the pliers come up to place in the next succeeding wire. All the wires being thus driven are left in a uniform position.

I do not deem it necessary to recapitulate the movements of this machine in their order of succession, as this will be apparent to every competent machinist, and the periods of the different parts of the process being nearly the same as in ordinary coach-lace looms. The pliers are armed with a wire while the weft is being inserted between the warp, and are prepared to move back simultaneously with the lay at the proper interval, and place it under the figuring-warp. The rest $v^6$, Fig. 6, is attached to the breast-beam and arranged over the lace, to prevent the lace back of the breast-beam from rising up and thus carrying the wires $l^5$ $l^5$ away from the pliers when the warp is raised to form the sheds. $w^6$ represents the standard of the temples, (see Fig. 12,) which is screwed to the inside of the breast-beam and under the cloth. $x^6$ $x^6$ are the guides of the temples, which are fastened to the stand $w^6$ by the screw $y^6$ $y^6$. The cloth passes between the guides $x^6$ $x^6$, and is thus prevented from yielding when the wires $l^5$ $l^5$ are drawn out or pushed in.

The loom is put in motion and thrown out of gear as follows: The lever $z^6$, Fig. 1, turns on the stud $a^7$ and connects the clutch $f^7$ with the shifting-bar $b^7$, which slides in the guides $c^7$ $c^7$, Fig. 1. The dotted lines at $d^7$, Fig. 7, represents a spring embedded in the bar $b^7$. The spiral spring $e^7$ is attached at one extremity to the bar $b^7$, at the other to the breast-beam $u$. The lever $f^7$ turns on the stud $g^7$, Fig. 6, attached to the breast-beam. $h^7$, Fig. 2, is a latch which vibrates on a stud attached to the post $a$, and has a handle at its upper extremity, which the weaver grasps to stop the loom. The spring $j^7$, Fig. 7, being attached at one end to the latch $h^7$, at the other to the breast-beam, always tends to bring the latch $h^7$ toward the lever $f^7$. To put the loom in motion, the weaver grasps the handle $k^7$ and moves the bar $b^7$ toward the right, which movement of the bar moves the clutch $f'$, Fig. 4, by a forked lever, in the usual manner, connecting the clutch and slide, and connects the cogged wheel $g'$ with the pulley $a'$ at the instant the latch $h^7$ locks on the depending arm of the lever $f^7$ and secures the connection. To stop the loom, the weaver releases the catch $h^7$ and suffers the spring $e^7$, Fig. 6, to move the bar $b^7$ and throw the loom out of gear. In the event of the weft being exhausted on the bobbin in the shuttle, and also in case the shuttle does not arrive at its destination, it is desirable that the loom should be thrown out of gear to prevent an imperfect place being made in the lace.

Stopping the loom when the shuttle stops in its passage to and fro is effected as follows: The protecting-rod $l^7$, Fig. 6, turns in the bearings on the frame $u^5$ $u^5$, and has the arms $m^7$ $m^7$ extending from it, the upper extremities of which rest against the shuttle-binders $y^3$ $y^3$, Fig. 1. $n^7$ represents a spring which acts on the arm $m^7$ and urges both the arms $m^7$ $m^7$ against their respective binders $y^3$ $y^3$. $o^7$, Fig. 2, is the reverse arm, extending from the rod $l^7$ and supports the bar $p^7$, which connects with a latch by means of an elbow and connecting-rod, which are hid in the drawings under the breast-beam. When the shuttle enters the box properly, it pushes out the binder $y^3$ and depresses the bar $p^7$, and causes it to escape the lower shell of the lay as it comes forward to beat up the weft; but in the event the shuttle does not enter the box the spring $n^7$ raises the bar $p^7$ to meet the lower shell of the lay, which, as it comes forward, strikes against the end of it and releases the latch $h^7$ and suffers the spring $e^7$ to throw the loom out of gear.

Stopping the loom when the weft is exhausted may be understood as follows: $w^7$, Fig. 11, represents the shuttle, armed with the bobbin $x^7$, containing the weft. $y^7$ is a spring affixed to the front side of the shuttle, and is connected to the binder $z^7$. $c^8$ is the guide-wire, which guides the weft off of the bobbin $x^7$. $d^8$ is the stop-wire, sliding in holes through the guide-wire $c^8$ and the stand $e^8$. $f^8$ is a spiral spring, encircled around the stop-wire $d^8$, one end of which is attached to the wire $d^8$ by the spring $g^8$, inserted therein. The other abuts against the shuttle-wood. This spring yields to any gentle pressure on the end of the wire projecting beyond the guide-wire $c^8$, and returns as far as suffered by the pin $g^8$, when that pressure is removed. $h^8$ is a catch, which, when the stop-wire $d^8$ is pushed back even with the outside of the guide-wire $c^8$, locks into a notch in the stop-wire, and prevents its returning by the action of the spring $f^8$ until the said catch is again released. The lever $i^8$, Fig. 6, turns on the stud attached to the breast-beam $n'$, and extends along the side of the latch $h^7$, nearly to touch the shuttle-guide. When the stop-wire $d^8$ is in the position seen in Fig. 11, the shuttle will pass to and fro without acting on the lever $i^8$, and no effect is produced on the stop-motion; but when the filling is nearly exhausted on the bobbin, the spring $j^8$ recedes from the center, as seen in the bobbin $k^8$, and as it comes around releases the catch $h^8$, and suffers the spring $f^8$ to throw forward the wire $d^8$, which, as the shuttle enters the left-hand shuttle-box, strikes against the extremity of the lever $i^8$, releases the latch $h^7$, and suffers the spring $e^7$ to throw the loom out of gear.

It will be obvious from the foregoing that some parts of my invention may be dispensed with without changing the character of the others—as, for instance, instead of pushing the needles toward the pinchers or pliers that draw them out, lever $k^5$, Fig. 10, which pushes the wires toward the pliers, may be dispensed with, in which event the upright part of the frame $a^5$ must be removed to the reverse edge of the lace, and the bar $i^5$ pass between those ends of the wires which the pliers grasp to shift them, and the guide-iron $n^5$ must also rest against the said ends presented to the pliers or forceps.

The standards which support the reciprocating bar $x^5$, instead of being stationary with the frame $v^5$, may be affixed to an axle, and vibrate in bearings attached to said frame. The frame formed by the said axle and standards should be prevented from falling from the perpendicular toward the shuttle-boxes by a stop attached to the bearings in which the axle turns, or to the frame $v^4$ which supports the said bearings. A spring is affixed to the frame $v^5$, which acts on the frame formed by the said axle and standards, and always tends to keep the said frame in a perpendicular position and against the aforesaid stop. A guide-iron is affixed to the said frame, which guide-iron, when the pliers approach the wires to grasp them, glide along the side of another guide attached to the frame $a^5$, and guides the pliers into the right position to take the last of the series of wires without acting on the one next in order to it.

Many parts of machinery have been described above without any intention of claiming them as new inventions, but merely for the purpose of leading to and more readily illustrating the design and specification of my improvements; but I deem it preferable to employ all the improvements which I claim connectedly.

Having pointed out the nature of my invention, described the manner of applying the same in connection with certain parts common to other looms, and shown some of the modifications which may be made without changing the principle of the remaining portions, what I claim as my invention, and desire to secure by Letters Patent, is—

1. The method of separating from the series of wires over which the figure has been wrought the last one of the series, which is to be withdrawn by means of an instrument introduced between it and the one next to it, when this is operated by machinery substantially as herein described, whereby this separating-instrument is made to perform its appropriate function at appropriate intervals relatively to the other operations of the loom, as herein described.

2. The method of forcing or pushing the wires over which the figure has been wrought toward the instrument or instruments by which they are to be withdrawn, when this is so combined with the loom as to be operated by mechanical means substantially as herein described, whether the requisite motions be given to it by the mechanical agents herein enumerated or their equivalents.

3. The method, substantially as herein described, of withdrawing the said figuring-wires from the figure wrought over them, and introducing them under another portion of the figuring-warp by means of pinchers, pliers, forceps, or other analogous device so operated as to receive the requisite movements by machinery, substantially in the manner herein described, whether the movements be given by cams, levers, and slides, or by their equivalents, as described.

4. In combination, all three or any two of the devices or methods covered by the first, second, and third sections of my claim, for the purposes and in the manner substantially as described.

5. In combination with either or with all of the three items covered by the foregoing claims, the employment of a guide resting against the last of the series of figuring-wires to preserve the machinery, which acts thereon in the required position relatively to the wire to be withdrawn, substantially as described.

6. Making the shuttle-boxes detached from the lay, substantially as herein described, that the lay may be free to move independently of the shuttle-boxes, as described.

7. Making the shuttle-boxes substantially as described above, in combination with the method of withdrawing the figuring-wires from under the figures wrought over them, and introducing them under the figuring-warp, substantially as described, whereby I am enabled to locate and operate this machinery without the impediment or interruption to which it would be subjected if the shuttle-boxes were attached to and moved with the lay, as described.

E. B. BIGELOW.

Witnesses:

WM. C. APPLETON,

D. H. JACKSON.